No. 640,877.  
J. A. COSS & F. G. PARSHALL.  
VEHICLE SEAT FASTENER.  
(Application filed Apr. 21, 1899.)  
Patented Jan. 9, 1900.
(No Model.)
Fig. 1.
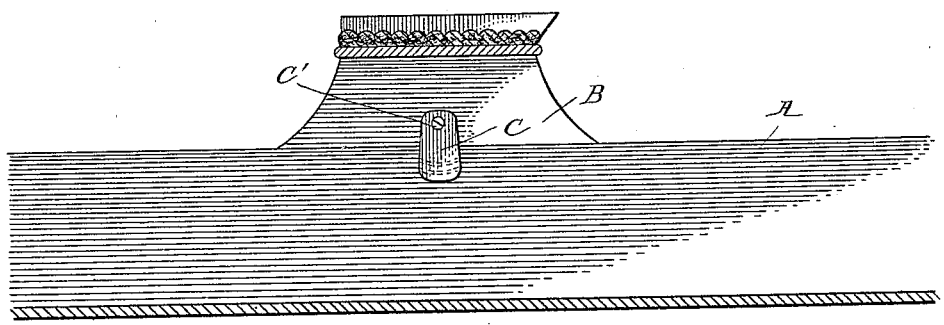
Fig. 2.     Fig. 3.
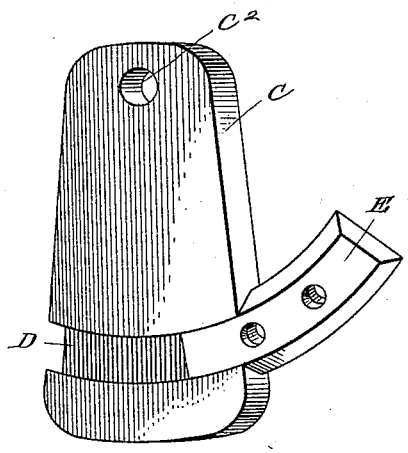 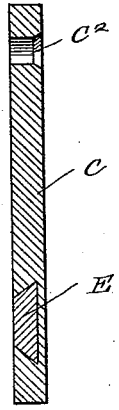
Witnesses  
T. P. Britt  
Chas. E. Brock
Inventor  
J. A. Coss,  
F. G. Parshall,  
By Dimara & Co.  
Attorneys

UNITED STATES PATENT OFFICE.

JOHN A. COSS AND FRANK G. PARSHALL, OF PHŒNIX MILLS, NEW YORK.

VEHICLE-SEAT FASTENER.

SPECIFICATION forming part of Letters Patent No. 640,877, dated January 9, 1900.

Application filed April 21, 1899. Serial No. 713,988. (No model.)

*To all whom it may concern:*

Be it known that we, JOHN A. COSS and FRANK G. PARSHALL, citizens of the United States, residing at Phœnix Mills, in the county of Otsego and State of New York, have invented a new and useful Improvement in Vehicle-Seat Fasteners, of which the following is a specification.

This invention relates generally to carriages and wagons, and more especially to an improved means for fastening the seat upon the body of the carriage or wagon, the object being to provide an exceedingly cheap and simple means for the purpose of securely locking the seat to the body, which means can be quickly or easily thrown into or out of operation, so that the seat can be quickly and easily attached or detached, as desired; and with this object in view the invention consists, essentially, in attaching a grooved dovetailed cleat to the body of the vehicle or the side of the seat and in arranging a dovetailed clamping-plate upon the seat or body portion and having a dovetailed groove adapted to receive a dovetailed cleat when the clamping-plate is turned down or up to a vertical position.

The invention consists also in certain details of construction and novelties of combination, all of which will be fully described hereinafter, and pointed out in the claim.

In the drawings forming part of this specification, Figure 1 is a view showing the practical application of our invention. Fig. 2 is a detail perspective view showing the detail construction of the various parts. Fig. 3 is a transverse vertical section of the dovetailed cleat and clamping-plate.

Referring to the drawings, A indicates the body of the vehicle, and B is a side portion of the seat. A clamp or locking plate C is pivoted to the side of the seat by means of a bolt C', and in the opposite end of said plate is produced a dovetail groove or recess D, said groove or recess being struck upon the arc of a circle, the center of which is the dovetail opening $C^2$. A grooved cleat E is secured to the side of the vehicle-body, the edges of said cleat being dovetailed to correspond with the dovetailed groove or recess of the clamp or locking plate C, and this cleat is also curved in the arc of a circle to correspond with the curve of the groove or recess, so that when the seat is adjusted to its proper position and the locking or clamping plate C turned down the cleat will enter the dovetailed groove, and thereby securely lock the seat to the body of the vehicle. If desired, the cleat may be arranged slightly eccentric, which will increase the binding or locking action of the plate. If desired, the cleat can be secured to the side of the seat and the plate to the side of the vehicle-body, it being obvious that the mere reversal of the parts will not interfere with the operation of the invention.

From the above description, taken in connection with the accompanying drawings, it will be clearly seen that we provide an exceedingly cheap, simple, and efficient means for securing the vehicle-seat to the body, and it can be applied to any and all vehicles now in use.

Having thus fully described our invention, what we claim as new, and desire to secure by Letters Patent of the United States, is—

The combination with the vehicle seat and body of the locking or clamping plate pivotally secured to the side of the seat and having a segmental dovetailed groove or recess in its inner face, and a segmental bar or cleat secured to the side of the body and dovetailed to correspond with the segmental groove in the plate, said cleat being adapted to fit in said groove, substantially as described.

JOHN A. COSS.
FRANK G. PARSHALL.

Witnesses:
F. M. SHUMWAY,
F. L. GILBERT.